| United States Patent [19] | [11] Patent Number: 4,610,922 |
| Kumasaka et al. | [45] Date of Patent: Sep. 9, 1986 |

[54] ASPHALT IMPREGNATED FOAM AND METHOD OF PRODUCING THE SAME

[75] Inventors: Sadao Kumasaka; Satomi Tada; Koretoshi Katsuki, all of Tokyo; Ryoji Nagamine, Saitama; Hiroshi Taniguchi, Tokyo, all of Japan

[73] Assignee: Human Industry Corporation, Tokyo, Japan

[21] Appl. No.: 809,523

[22] Filed: Dec. 16, 1985

[30] Foreign Application Priority Data

Dec. 27, 1984 [JP] Japan .................. 59-278329

[51] Int. Cl.[4] .................................. B32B 11/04
[52] U.S. Cl. .................. 428/304.4; 427/244; 428/317.9; 428/489
[58] Field of Search ............ 428/304.4, 306.6, 311.1, 428/311.5, 317.1, 317.7, 317.9, 318.4, 489; 427/244

[56] References Cited

U.S. PATENT DOCUMENTS

| 3,483,664 | 12/1969 | Funk et al. | 428/317.1 |
| 3,535,198 | 10/1970 | Bloom | 428/317.7 |
| 3,802,950 | 4/1974 | Stevens | 428/318.4 |
| 4,351,873 | 9/1982 | Davis | 428/489 |
| 4,357,377 | 11/1982 | Yamamoto | 428/489 |

*Primary Examiner*—William J. Van Balen
*Attorney, Agent, or Firm*—Frishauf, Holtz, Goodman & Woodward

[57] ABSTRACT

An asphalt foam having open cells wherein asphalt mixed with an alkali metal silicate is fixed to the wall of the open cells. The asphalt foam is useful for a joint filler, a vehicle floor material, etc. A method of producing the asphalt foam, which comprises the steps of impregnating an open cell foam sheet with an aqueous mixture consisting of asphalt emulsion and an aqueous solution of an alkali metal silicate, and drying the impregnated foam sheet.

9 Claims, 1 Drawing Figure

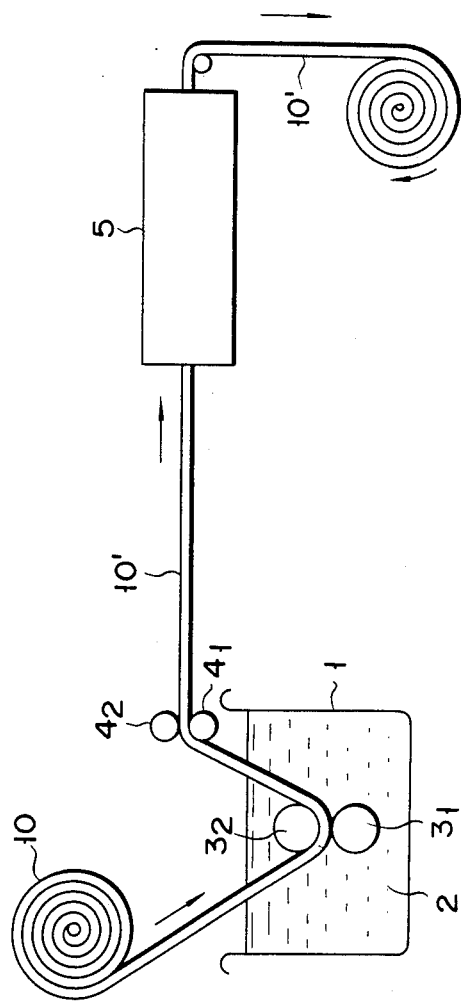

ASPHALT IMPREGNATED FOAM AND METHOD OF PRODUCING THE SAME

BACKGROUND OF THE INVENTION

1. Field of the Invention

This invention relates to an asphalt foam, particularly, an asphalt foam excellent in its workability and flame retardancy, and a method of producing the same.

2. Description of the Prior Art

A foam having open cells, e.g., urethane foam, if impregnated with a molten asphalt, is enabled to exhibit a water repellency and a moderate restoring force. The asphalt-impregnated foam, which is called an asphalt foam, is widely used as, for example, a joint filler. Recently, the asphalt foam has also been found to be excellent in its sound absorbing and shielding properties and exhibit a high vibration resistance, leading to an additional use of the asphalt foam as, for example, a vehicle floor material requiring a sound-proof and vibration resistance properties.

In the conventional asphalt foam, however, the impregnated asphalt is simply attached to the cell wall of the foam, giving rise to serious problems. For example, the asphalt oozes onto the foam surface in the punching step of the asphalt foam, making the foam surface sticky. Also, another material is stained with the oozing asphalt. What should also be noted is that the viscosity of the molten asphalt is changed depending on the heating conditions, resulting in failure to have the foam uniformly impregnated with the molten asphalt.

SUMMARY OF THE INVENTION

The present invention is intended to provide an asphalt foam free from the oozing of the impregnated asphalt and exhibiting an excellent flame retardancy, and a method of efficiently producing the same.

According to the present invention, there is provided an asphalt foam, comprising a foam sheet having open cells and asphalt attached to the wall of the open cell of the foam sheet, said asphalt being mixed with an alkali metal silicate.

Also provided is a method of producing an asphalt foam, comprising the step of impregnating a foam sheet having open cells with a mixture of an asphalt emulsion and an aqueous solution of an alkali metal silicate, followed by drying the impregnated foam sheet.

In the present invention, it is most desirable to use an urethane foam sheet as the foam sheet having open cells, though other foam sheets may also be used as far as the foam sheet has open cells.

The asphalt emulsion used in the method of the present invention can be prepared by the known method. For example, a natural asphalt is mechanically dispersed in water using, for example, a cationic or anionic surfactant so as to prepare a desired emulsion. In addition to the natural asphalt, it is also possible to use a straight asphalt obtained as a residue in the distillation of an asphalt-rich crude oil or a blown asphalt prepared by blowing a heated air into the straight asphalt. The amount of water, which is not particularly restricted, should desirably be 1.5 to 0.55 parts by weight relative to 1 part by weight of asphalt. If the water amount is less than 0.55 parts by weight, it is difficult to obtain a uniform emulsion. On the other hand, if the water amount exceeds 1.5 parts by weight, the amount of asphalt attached to the cell wall of the product asphalt foam is too small to enable the asphalt foam to exhibit a satisfactory water repellency.

It is important to note that the asphalt emulsion contains an aqueous solution of an alkali metal silicate of the general formula given below, said solution being generally called a water glass:

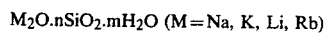

$M_2O \cdot nSiO_2 \cdot mH_2O$ (M=Na, K, Li, Rb)

Almost all the water glasses which are industrially used including, for example, JIS No. 1, JIS No. 2 and JIS No. 3, contain Na or K as the alkali metal M. In the present invention, it is desirable to use these water glasses.

A mixture between the asphalt emulsion and the water glass is prepared first in the present invention. The mixture should desirably contain 0.3 to 30 parts by weight of the alkali metal silicate relative to 100 parts by weight of the asphalt emulsion. The hardness of the product asphalt foam is increased as the silicate content is increased. It should be noted that the viscosity of the aqueous mixture can be controlled as desired by adding water, a thickener, a surfactant, etc. Thus, the viscosity mentioned can be set appropriately in view of the impregnating method and conditions, e.g., cell size of the foam sheet and impregnating temperature. The foam sheet can be impregnated with the aqueous mixture by means of, for example, immersion, spraying, vacuum impregnation or transcription. The foam sheet impregnated with the aqueous mixture is dried so as to obtain a desired asphalt foam.

In the resultant asphalt foam, the asphalt attached to the cell wall of the foam is covered with the water glass. As a result, the asphalt is prevented from oozing onto the foam surface, making it possible to apply punching satisfactorily to the asphalt foam sheets even if several sheets are stacked one upon the other. What should also be noted is that the water glass is a well-known flame retardant. It follows that the asphalt foam of the present invention also exhibits a flame retardancy.

In the present invention, an inorganic powder including fillers widely used in the resin molding such as calcium carbonate, magnesium carbonate, clay, mica and talc, and metal oxides such as zinc oxide, magnesium oxide and calcium oxide may also be added as desired to the mixture between the asphalt emulsion and the aqueous solution of an alkali metal silicate. The inorganic powder serves to improve the flame retardancy and hardness of the product asphalt foam. Also, the water glass is prevented by the inorganic powder from absorbing water and, thus, is not liquefied. The amount of the inorganic powder, which is determined appropriately, should generally range between 30 and 150 parts by weight relative to 100 parts by weight of the asphalt emulsion, i.e., between 12 and 230 parts by weight relative to 100 parts by weight of the asphalt.

BRIEF DESCRIPTION OF THE DRAWING

The accompanying drawing illustrates an impregnating apparatus used in the method of producing an asphalt foam of the present invention.

DETAILED DESCRIPTION OF THE PREFERRED EMBODIMENT

Described in the following are Examples of the present invention.

EXAMPLE 1

1. Preparation of Aqueous Mixture

An aqueous asphalt emulsion was prepared first by uniformly dispersing with a homogenizer a mixture consisting of 50 parts by weight of a blown asphalt, 50 parts by weight of water and 0.3 part by weight of sodium alkylsulfate acting as a surfactant. Then, 2.0 parts by weight of water glass was added to 100 parts by weight of the asphalt emulsion so as to prepare the desired aqueous mixture.

2. Preparation of Asphalt Foam

An apparatus as shown in the accompanying drawing was used for producing an asphalt foam. As seen from the drawing, the apparatus comprises a vessel 1 filled with an aqueous mixture 2, a pair of immersion rolls $3_1$, $3_2$ disposed within the aqueous mixture 2, and a pair of drawing rolls $4_1$, $4_2$ disposed above the vessel 1. A soft polyurethane foam sheet 10 having a density of 0.020 $g/cm^3$ and a thickness of 10 mm was continuously passed through the immersion rolls and the drawing rolls. When passing through the clearance between the immersion rolls $3_1$ and $3_2$, the sheet 10 is impregnated with the aqueous mixture. On the other hand, an excess aqueous mixture is removed when the sheet 10 passes through the clearance between the drawing rolls $4_1$ and $4_2$. Thus, the operating conditions were appropriately controlled to allow a sheet 10' downstream of the drawing rolls to contain 260 parts by weight of the aqueous mixture relative to 100 parts by weight of the soft polyurethane foam. The sheet 10' impregnated with the aqueous mixture was introduced into a drying oven 5 kept at 120° C. so as to cure the sheet 10' and, thus, to obtain a desired asphalt foam. Finally, the product asphalt foam was wound about a take-up roll.

EXAMPLE 2

An asphalt foam was produced as in Example 1, except that the aqueous mixture was prepared by adding 5.0 parts by weight of water glass and 15 parts by weight of magnesium oxide to 100 parts by weight of the aqueous asphalt emulsion used in Example 1.

EXAMPLE 3

An asphalt foam was produced as in Example 1, except that the aqueous mixture was prepared by adding 8 parts by weight of water glass and 80 parts by weight of calcium carbonate to 100 parts by weight of the aqueous asphalt emulsion used in Example 1.

The asphalt foam obtained in each of Examples 1 to 3 was found to be low in its restoring rate and high in its sound absorbing and shielding properties. In addition, the asphalt was not found to ooze onto the foam surface when punching was applied to a plurality of asphalt foam sheets stacked one upon the other.

What is claimed is:

1. An asphalt foam, comprising a foam sheet having open cells and asphalt attached to the cell wall of the foam sheet, said asphalt being mixed with an alkali metal silicate.

2. The asphalt foam according to claim 1, wherein asphalt mixture further contains an inorganic powder.

3. The asphalt foam according to claim 2, wherein the amount of the inorganic powder ranges between 12 and 230 parts by weight relative to 100 parts by weight of the asphalt.

4. The asphalt foam according to claim 2, wherein the inorganic powder consists of at least one of calcium carbonate, magnesium carbonate, clay, mica and talc.

5. The asphalt foam according to claim 2, wherein the inorganic powder consists of at least one metal oxide selected from zinc oxide, magnesium oxide and calcium oxide.

6. The asphalt foam according to claim 1, wherein the ratio of the asphalt emulsion to the alkali metal silicate ranges between 100:0.3 and 100:30.

7. A method of producing an asphalt foam, comprising the step of impregnating a foam sheet having open cells with an aqueous mixture consisting of an asphalt emulsion and an aqueous solution of an alkali metal silicate, followed by drying the impregnated foam sheet.

8. The method according to claim 7, wherein the mixing ratio of the asphalt emulsion to the aqueous solution of the alkali metal silicate is set at 100:5.0 to 30 by weight.

9. The method according to claim 7, wherein an inorganic powder is added to the aqueous mixture in an amount of 10 to 150 parts by weight relative to 100 parts by weight of the asphalt emulsion.

* * * * *